United States Patent
Taniguchi

(10) Patent No.: US 6,373,897 B1
(45) Date of Patent: Apr. 16, 2002

(54) MOVING QUANTITY DETECTION APPARATUS AND METHOD

(75) Inventor: Yasuhiro Taniguchi, Osaka-fu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/334,950

(22) Filed: Jun. 17, 1999

(30) Foreign Application Priority Data

Jun. 19, 1998 (JP) .......................................... 10-172838

(51) Int. Cl.[7] ................................................ H04N 7/12
(52) U.S. Cl. .................................. 375/240.21; 348/699
(58) Field of Search ........................... 375/240, 240.16, 375/240.12, 240.24, 240.29, 240.21; 348/699, 700, 405.1, 412.1, 416.1, 417.1, 418.1, 420.1; H04N 7/12

(56) References Cited

U.S. PATENT DOCUMENTS 6,208,608 B1 * 2/2000 Jenskin ........................ 345/433
6,148,101 A * 11/2000 Tanaka et al. ............... 382/156
6,304,682 B1 * 10/2001 Patti ............................ 382/299

FOREIGN PATENT DOCUMENTS

JP 6-139361 5/1994

* cited by examiner

Primary Examiner—Nhon T Diep
(74) Attorney, Agent, or Firm—Finnegan, Henderson, Farabow, Garrett & Dunner, L.L.P.

(57) ABSTRACT

A plurality of images are inputted in time series at a predetermined interval. An image processing section divides one image into a plurality of blocks and calculates each evaluation value between a particular block on the one image and each neighboring block on next image. A reduced image processing section reduces the plurality of images by a predetermined reduction ratio, divides one reduced image corresponding to the one image into a plurality of blocks, and calculates each evaluation value between a particular block on the one reduced image and each neighboring block on other reduced image corresponding to a multiple of the predetermined interval for the predetermined reduction ratio. A moving quantity detection section counts the evaluation value by unit of the each neighboring block for the time serial image and the other reduced image, selects one neighboring block whose evaluation value is highest, and calculates a moving quantity between the particular block and the one neighboring block.

21 Claims, 6 Drawing Sheets

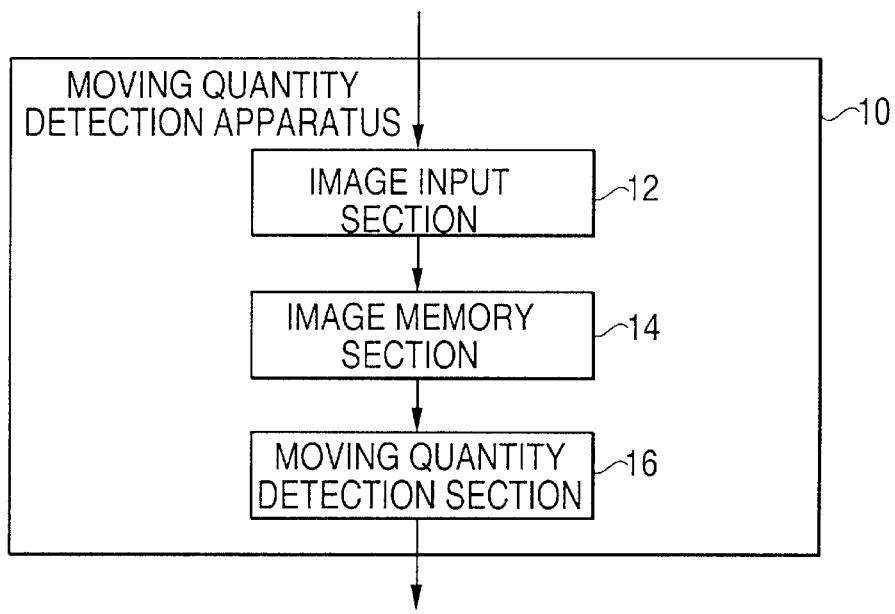
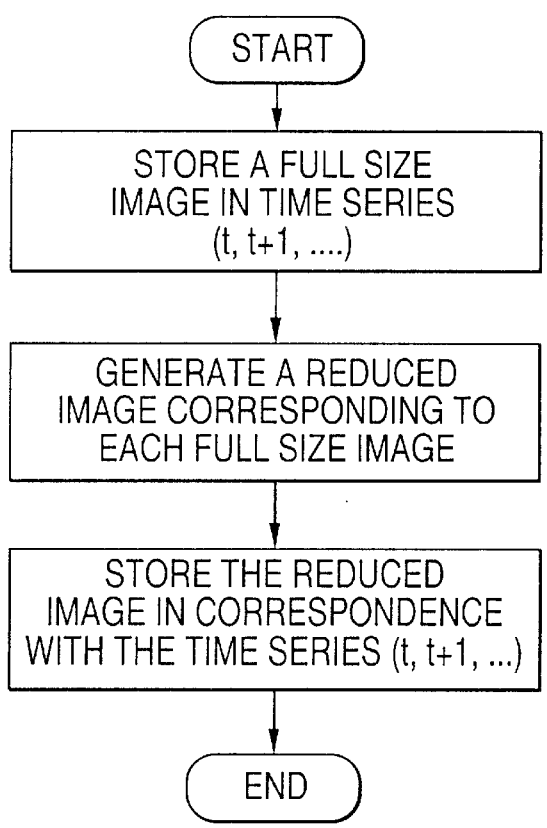

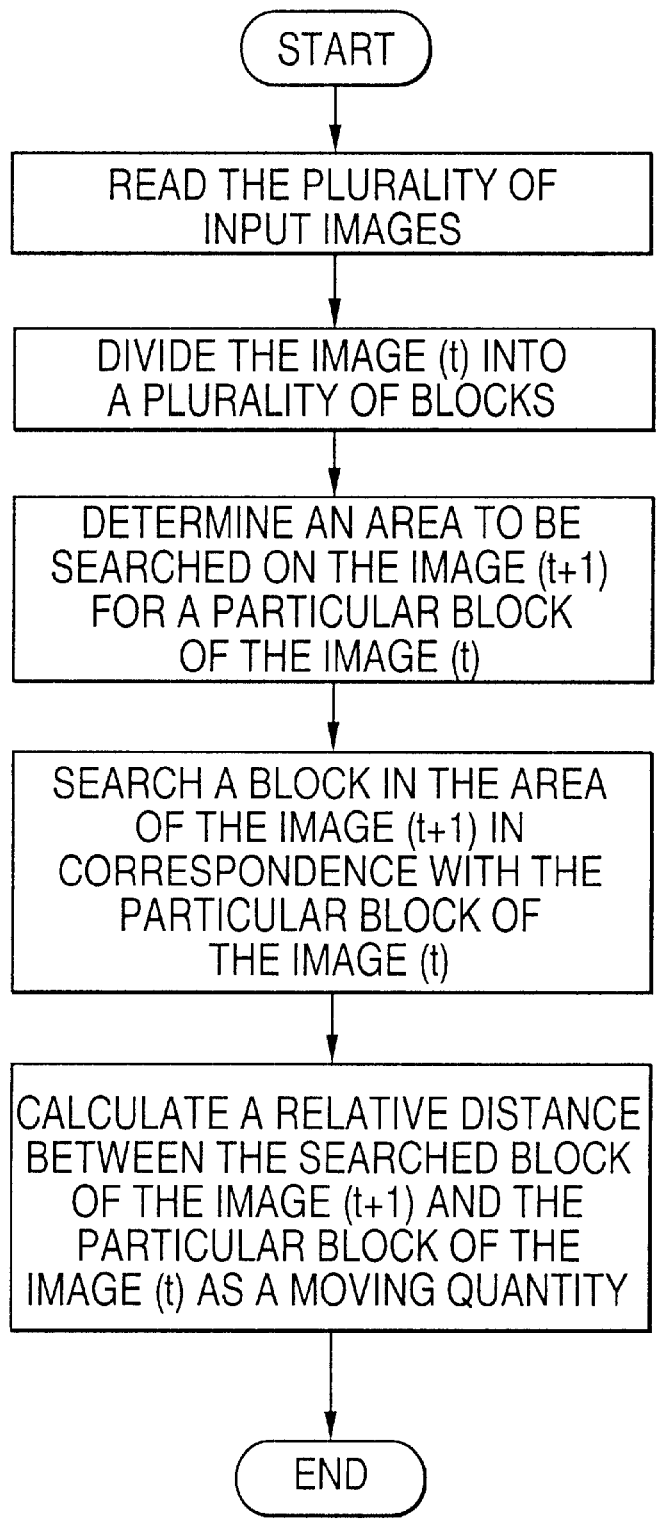

| IMAGE REDUCTION RATIO | BASIS IMAGE TIME | COMPARISON IMAGE TIME |
|---|---|---|
| 1/1 | t | t-1 |
| 1/2 | t | t-2 |
| 1/4 | t | t-4 |

| MOVING QUANTITY | (1, 1) | (1, 0) | (1, -1) | ... |
|---|---|---|---|---|
| EVALUATION VALUE OF A | $e_{A1}$ | $e_{A2}$ | $e_{A3}$ | ... |
| EVALUATION VALUE OF B | $e_{B1}$ | $e_{B2}$ | $e_{B3}$ | ... |

| MOVING QUANTITY | (1, 1) | (1, 0) | (1, -1) | ... |
|---|---|---|---|---|
| EVALUATION VALUE OF A' | $e'_{A1}$ | $e'_{A2}$ | $e'_{A3}$ | ... |
| EVALUATION VALUE OF B' | $e'_{B1}$ | $e'_{B2}$ | $e'_{B3}$ | ... |

A''(B'')

| MOVING QUANTITY | (1, 1) | (1, 0) | (1, -1) | ... |
|---|---|---|---|---|
| EVALUATION VALUE OF A'(B') | $e''_1$ | $e''_2$ | $e''_3$ | ... |

MOVING QUANTITY DETECTION APPARATUS AND METHOD

FIELD OF THE INVENTION

The present invention relates to a moving quantity detection apparatus and a method for correctly detecting a moving quantity of a block between a plurality of time sequential images.

BACKGROUND OF THE INVENTION

In the background art, a CCD image (charge coupled device) camera inputs an outdoor image to a computer. Data transmission from the camera to the computer is executed at a speed such as 30 frames per second according to the NTSC standard. Therefore, even if the ability of the computer increases, the input speed of the images does not increase and realization of control of high speed equipment according to the image information is difficult.

On the other hand, a new type of sensor using a sensitive variable element is disclosed in Japanese Patent disclosure PH6-139361. This element speeds-up the image processing circuit. A result of simple image processing is outputted as a rate of 100 frames per second. However, this image processing circuit is an analog version and processable calculation is relatively simple. For example, in an interactive game of gesture input type, a movement of the object is detected by using an artificial retina chip of (32×32) pixels. This movement information is insufficient for complex image processing with respect to precision and the number of frames per second.

Recently, a smart vision-sensor has been developed. In this sensor, the image is processed by using a digital circuit and simple image processing such as labelling of the area and calculation of the center of gravity is rapidly executed. However, the emphasis of this sensor is its parallel processing ability by unit of line. Therefore, it is difficult to precisely extract the moving vector of an area in two-dimensional space. In following explanation, the moving vector is called a "moving quantity".

Furthermore, recently, a super parallel-fast visual information processing system was developed. In this system, the sensor includes a digital processing circuit, and it is possible to pursue the area in a two-dimensional image at a speed of 1000 frames per second. However, this system is designed to execute all image processings using only neighboring calculations. Therefore, if the complexity and moving speed of the object increases, a calculation result of sufficient precision is not obtained.

In the near future, the sensor to which the above-mentioned digital processing circuit is loaded will be more developed. As a result, the image processing result for a image or a gray image will be outputted at a speed of 1000 frames per second. Accordingly, a method to rapidly and correctly detect the moving quantity of an area from a plurality of time series images that is loadable to the sensor to rapidly input and process the plurality of time series images is desired.

SUMMARY OF THE INVENTION

It is an object of the present invention to provide a moving quantity detection apparatus and a method to precisely detect the moving quantity of each area from a plurality of images in case the sensor inputs the plurality of images in a time series.

According to the present invention, there is provided a moving quantity detection apparatus, comprising: an image input means for inputting a plurality of images in a time series at a predetermined interval; a full size image processing means for dividing one image into a plurality of blocks with a predetermined size, and for calculating each evaluation value between a particular block on the one image and each neighboring block corresponding to the particular block on a time serial image; a reduced image processing means for reducing the plurality of images by a predetermined reduction ratio, for dividing one reduced image corresponding to the one image into a plurality of blocks as the predetermined size, and for calculating each evaluation value between a particular block on the one reduced image and each neighboring block corresponding to the particular block on the other reduced image corresponding to a multiple of the predetermined interval for the predetermined reduction ratio; and a moving quantity detection means for evaluating the correspondence value by unit of each neighboring block for the time sequential image and the other reduced image, for selecting the neighboring block whose evaluation value is highest of all neighboring blocks, and for calculating a relative distance between the particular block on the one image and the one neighboring block on the time serial image as a moving quantity.

Further in accordance with the present invention, there is also provided a moving quantity detection method, comprising the steps of: inputting a plurality of images in a time series at a predetermined interval; dividing one image into a plurality of blocks with a predetermined size; calculating each evaluation value between a particular block on the one image and each neighboring block corresponding to the particular block on the time serial image; reducing the plurality of images by a predetermined reduction ratio; dividing one reduced image corresponding to the one image into a plurality of blocks as the predetermined size; calculating each evaluation value between a particular block on the one reduced image and each neighboring block corresponding to the particular block on other reduced image corresponding to a multiple of the predetermined interval for the predetermined reduction ratio; evaluating the correspondence value by unit of the each neighboring block for the time sequential image and the other reduced image; selecting one neighboring block whose evaluation value is highest from the each neighboring block; and calculating a relative distance between the particular block on the one image and the one neighboring block on the time serial image as a moving quantity.

Further in accordance with the present invention, there is also provided a computer readable memory containing computer readable instructions, comprising: input of a plurality of images in a time series at a predetermined interval; instruction means for causing a computer to divide one image into a plurality of blocks with a predetermined size; instruction means for causing a computer to calculate each evaluation value between a particular block on the one image and each neighboring block corresponding to the particular block on the time serial image; instruction means for causing a computer to reduce the plurality of images by a predetermined reduction ratio; instruction means for causing a computer to divide one reduced image corresponding to the one image into a plurality of blocks as the predetermined size; instruction means for causing a computer to calculate each evaluation value between a particular block on the one reduced image and each neighboring block corresponding to the particular block on the other reduced image corresponding to a multiple of the predetermined interval for the predetermined reduction ratio; instruction means for causing a computer to evaluate the correspondence value by unit of the each neighboring block for the time sequential image and the other reduced image; instruction means for causing a computer to select one neighboring block whose evaluation value is highest of all the neighboring blocks; and instruction means for causing a computer to calculate a relative distance between the particular block on the one image and the one neighboring block on the time serial image as a moving quantity.

BRIEF DESCRIPTION OF THE DRAWINGS

FIG. 1 is a block diagram of the moving quantity detection apparatus according to the present invention.

FIG. 3 is a flow chart of processing of a image memory section in FIG. 1.

FIG. 4 is a flow chart of the processing of a moving quantity detection section in FIG. 1.

DETAILED DESCRIPTION OF THE PREFERRED EMBODIMENT

FIG. 1 is a block diagram of the moving quantity detection apparatus according to the present invention. The moving quantity detection apparatus detects the moving quantity of an area shown in a plurality of time series images, which includes an image input section 12, an image memory section 14, and a moving quantity detection section 16.

The image input section 12 inputs the plurality of images in a time series at a predetermined interval. The image includes a background and a moving object. The plurality of images are stored in the image memory section 14 in time order. In this case, the image input section 12 takes a photograph of various kinds of objects by using a fixed or a moving sensor and rapidly inputs the time series images at a rate of several hundreds or several thousands images per second. Examples object imaged includes a car, a road, and a billboard. It is not necessary to attach a special color or mark to these objects in order to detect them.

The image memory section 14 stores the plurality of time series images inputted by the image input section 12 and supplies the plurality of time series images to the moving quantity detection section 16 as weeded. The moving quantity detection section 16 utilizes the plurality of images transferred from the image memory section 14. In this case, the moving quantity detection section 16 divides each image into a plurality of blocks of a predetermined size (lattice condition), and detects a moving quantity of the block between a plurality of time series images.

Figure 2A:
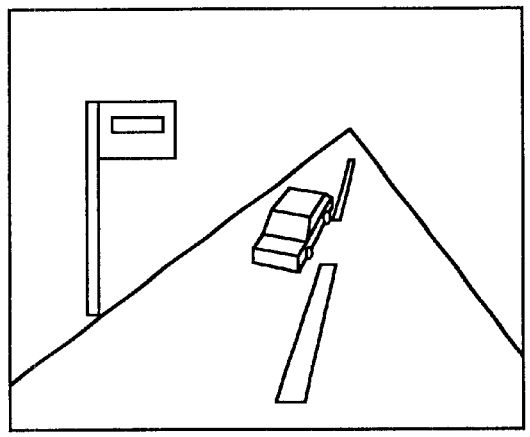
FIGS. 2A, 2B, and 2C are schematic diagrams of two time series images and the moving quantity between the two time series images.
Figure 2B:
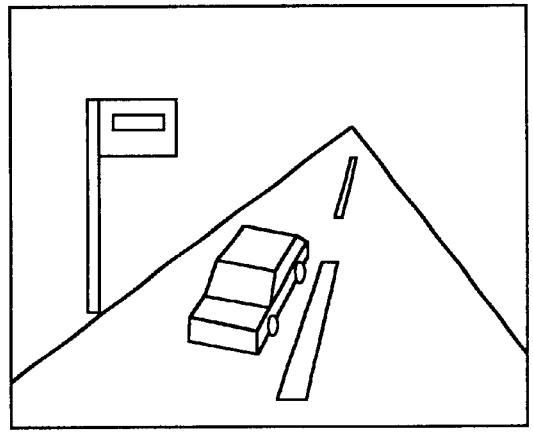
Figure 2C:
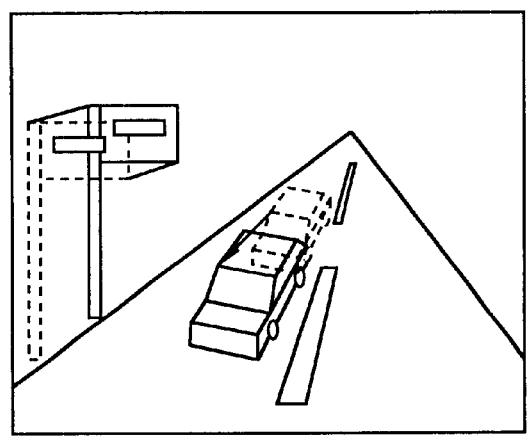

Next, a processing of the moving quantity detection apparatus is explained in detail. FIGS. 2A, 2B, and 2C are schematic diagrams of the images processed by the moving quantity detection apparatus 10. In this case, assume that a moving car on the road is regarded as a moving object and this moving object is viewed by a camera placed on a tower aside the road or another car moving ahead of the moving object. FIG. 2A is an input image at time (t) and FIG. 2B is another input image at time (t+1). FIG. 2C is the difference between the image of FIG. 2A and the image of FIG. 2B. These images are input in a time series by the image input section 12.

In general image processing, the images are obtained at a rate of 30 layers per second. If a moving quantity of the object between images is large and a fast moving object is pursued, a wide search area is necessary to be set on the image. However, in this image processing section 12, the images can be rapidly obtained at a rate of 1000 layers per second. When rapidly obtaining images, the search area to pursue the object is set at a small size. For example, if the object moving almost 1 pixel per ⅟1000 second is taken by the camera as a video rate, the search area is set on the image at "±33 pixels". However, if the images are obtained at 1000 layers per second, the search area is set on the image at "±2 pixels" and the search processing is rapidly executed. In the following explanation, assume that a moving quantity of the object between the time series images is below 2 pixels. In this case, obtaining images by unit of ⅟1000 pixel as the time series image is called a sampling along a time direction.

The images rapidly inputted by the image input section 12 are stored in the image memory section 14. FIG. 3 is a flow chart of the processing of the image memory section 14. First, the input image itself (full size image) is stored in a time series. Then, each input image is reduced as a reduction ratio "$2^{-M}$". This reduction of the full size image is called a transformation along a space direction.

"M" is a positive integer to be set according to the ability of image processing and memory quantity. As a reduction method, the full size image is first divided into a plurality of blocks of N×N pixels as matrix condition. In case of ½ reduction, both the vertical length and the horizontal length of the full size image are reduced by ½ while each pixel size and each block size does not change. Therefore, the number of blocks of the reduced image is decreased as ¼ in comparison with the full size image. Then, these reduced images are stored in correspondence with the full size image. The reduction ratio may be arbitrarily set according to the ability of image processing or memory quantity.

FIG. 4 is a flow chart of the processing of the moving quantity detection section 16.

(1) Basic Method

First, the image is divided into a plurality of blocks of N×N pixels as a matrix condition. Then, the strength or density of the edge in each block is calculated. Each block is determined to correspond to an area on the time serial image (next or previous image), according to the edge feature in each block.

Figure 5B:
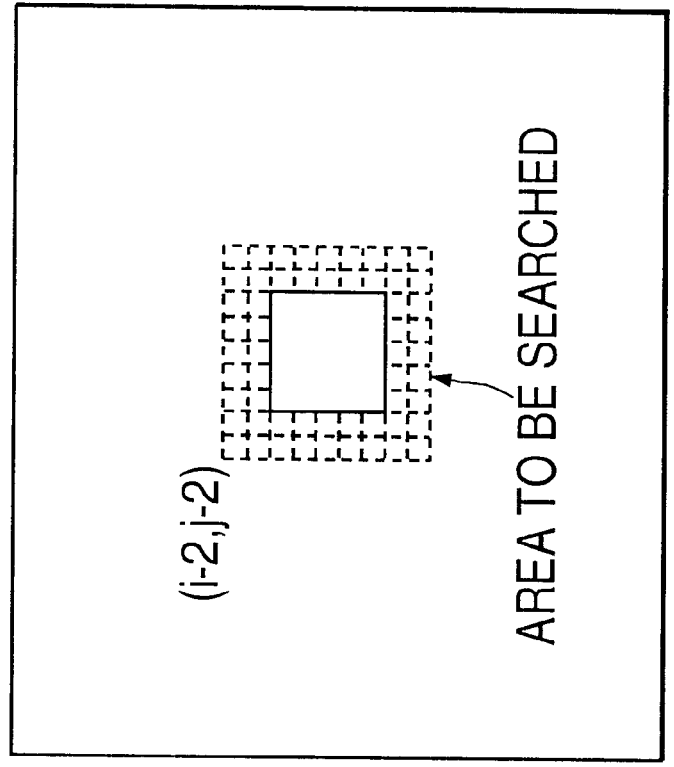
FIGS. 5A and 5B are schematic diagrams of a particular block of one image and a search area of previous image.
Figure 5A:
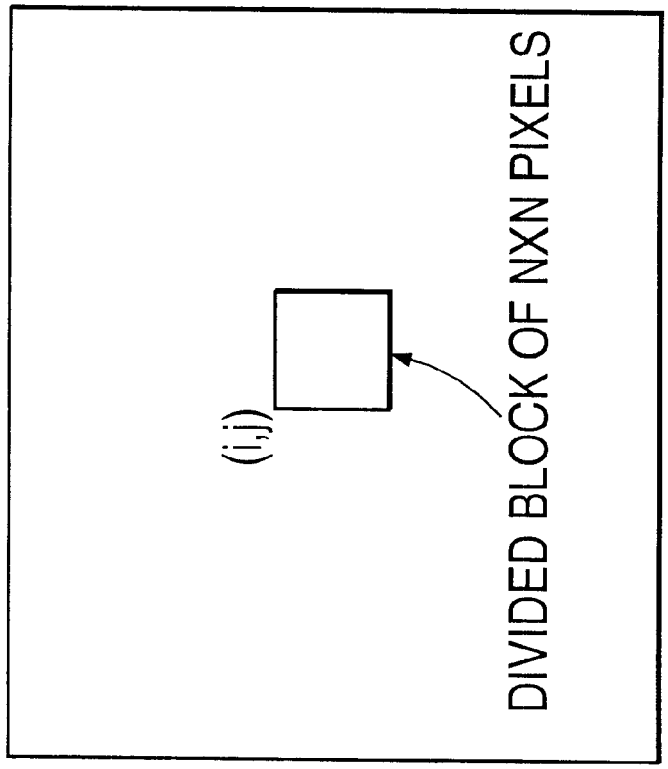

Actually, by threshold processing, any block containing no strong edge element is excluded from the candidate blocks for the corresponding search because search processing of the corresponding area is impossible. Next, the candidate block for the corresponding search is examined to determine how to move between the input image and next (or previous) image. FIG. 5A shows an example of a particular block on the image (t) as the candidate for corresponding search. FIG. 5B shows an example of an area to be searched on the image (t+1) for the particular block. In this case, the moving quantity of the object between time series images is below 2 pixels. Therefore, if the left upper coordinate of the particular block on the image (t) is (i, j) as shown in FIG. 5A, the left upper coordinate of the search area on the image (t+1) is (i−2, j−2) as shown in FIG. 5B. In this case, as for a faster moving object, a wider search area is set. If the moving quantity is below 2 pixels, the particular block of the image (t) corresponds to the block whose evaluation value is highest in the area of the image (t+1). The evaluation value is calculated as a sum of the absolute value or square of difference of gray value or color value between each pixel in the particular block of the image (t) and corresponding pixel in a block of the image (t+1). For example, in case the evaluation value is a sum of square of difference of intensity degree, a block whose following value is minimum in the search area is regarded as the corresponding area.

$$D(k, l; -2 \leq k \leq 2, -2 \leq l \leq 2) = \frac{1}{N^2} \sum_j \sum_i (I_t(i, j) - I_{t-1}(i+k, j+l))^2$$

In this case, if the evaluation value as the minimum is below a threshold, the relative distance between a position of the particular block on the image (t) and a position of the corresponding block on the image (t+1) is calculated as the moving quantity. In this way, the moving quantity is respectively calculated between two time series images (t~t+1), (t+1~t+2) . . . (t+(n−1), t+n). Then, these moving quantities are accumulated from the first time series image (t) and the last time series image (t+n). As a result, the moving quantity at the interval of the video rate (1/30 second) longer than 1/1000 second is totally calculated.

(2) A Method for Using the Reduced Image

In above-mentioned method (1), a local search for a corresponding block is repeated at short intervals (1/1000 second) between two time series images, and a total moving quantity at a long interval (1/30 second) from the first time series image to the last time series image is calculated. Therefore, the effect of noise are included in the total moving quantity. In the present invention, the moving quantity of the particular block is thus stably calculated by using a ½ reduced image and a ¼ reduced image stored in the image memory section 14.

Figures 6A, 6B:
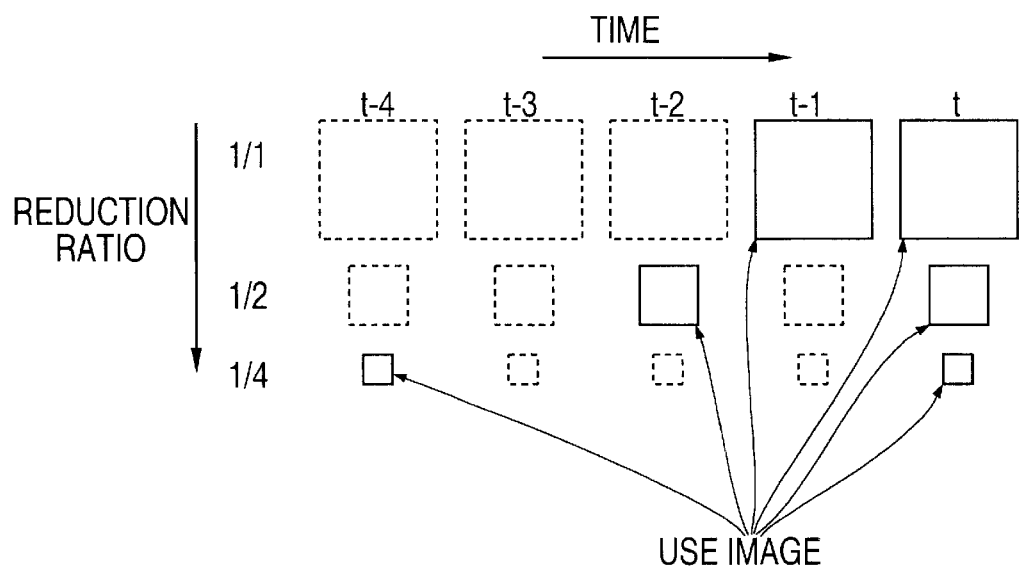
FIGS. 6A and 6B are schematic diagrams of a relation between a basis image time and a comparison image time by unit of reduction ratio.

FIG. 6A shows a table between the basis image time and comparison image time for each reduction ratio. FIG. 6B shows a schematic diagram of a pair of use images for each reduction ratio. In the same way as in method (1) for the full size image, the moving quantity is respectively calculated for a ½ reduced image and a ¼ reduced image. If a corresponding block is correctly determined for the particular block, the moving quantity between ½ reduced image (t−1) and ½ reduced image (t) is ½ the moving quantity between the full size image (t−1) and the full size image (t). In the same way, the moving quantity between ¼ reduced image (t−1) and ¼ reduced image (t) is ¼ of the moving quantity between the full size image (t−1) and the full size image (t). Conversely, the moving quantity between the ½ reduced image (t−2) and the ½ reduced image (t) is equal to the moving quantity between the full size image (t−1) and the full size image (t). The moving quantity between ¼ reduced image (t−4) and ¼ reduced image (t) is equal to the moving quantity between the full size image (t−1) and the full size image (t). In this case, the evaluation value described in the method (1) is used.

In short, the evaluation value of the reduced image between a predetermined interval corresponding to the reduction ratio is calculated by unit of the moving quantity. The evaluation value of the full size image between the image input interval is calculated by unit of the moving quantity. A total evaluation value is accumulated for the reduced image and the full size image by unit of the moving quantity. The predetermined interval corresponding to the reduction ratio is an interval between the present input timing and former input timing whose moving quantity of the reduced image is equal to the moving quantity of the full size image between the present input timing and just before input timing.

Concretely speaking, as shown in FIG. 6B, for a ½ reduced image an evaluation value (H2) of the moving quantity between timing (t−2) and timing (t) is used because this moving quantity is equal to the moving quantity of the full size image between timing (t−1) and timing (t). In the same way, a ¼ reduced image evaluation value (H4) of the moving quantity between timing (t−4) and timing (t) is used. These evaluation values (H2) (H4) are added to the evaluation value (H1) of the full size image by unit of the moving quantity. The moving quantity whose total evaluation value is highest of all total evaluation values is selected from each moving quantity. If the reduced image is divided into a plurality of blocks having the same block size as the full size image, one block in a ½ reduced image is equivalently four blocks in the full size image as shown in the left side of FIGS. 7A, 7B. Thus, one block in the ½ reduced image covers four times the area of one block in the full size image. In the same way, one block in a ¼ reduced image is equivalently sixteen blocks in the full size image as shown in left side of FIGS. 7A, 7C. Thus, one block in the ¼ reduced image covers sixteen times the area of one block of the full size image.

Figure 7A:
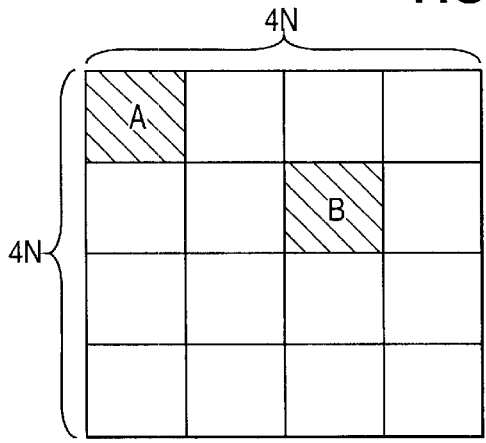
FIGS. 7A, 7B and 7C are schematic diagrams of a full size image, ½ reduced image, ¼ reduced image and each corresponding table of the moving quantity and the evaluation value.

For example, as shown in FIG. 7A, assume that a moving quantity of two particular blocks "A" and "B" between a previous image (t−1) and a present image (t) is decided. If the moving quantity is below "±2 pixels", candidates for the moving quantity are "(1, 1) (1, 0) (1, −1) (0, 1) (0, 0) (0, −1) (−1, 1) (−1, 0) (−1, 1)". In this case, the following evaluation values are calculated by unit of the candidate of the moving quantity for each block "A" and "B" (i=1~9: number of candidates).

$e_{Ai}$: evaluation value of block A between two full size images (t−1) (t) shown in FIG. 7A.

$e_{Bi}$: evaluation value of block B between two full size images (t−1) (t) shown in FIG. 7A.

Figure 7B:
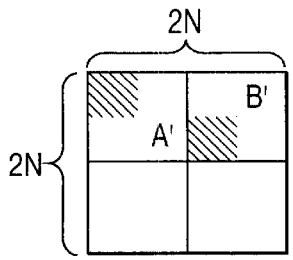

$e_{Ai}'$: evaluation value of block A' between two ½ reduced images (t−2) (t) shown in FIG. 7B.

$e_{Bi}'$: evaluation value of block B' between two ½ reduced images (t−2) (t) shown in FIG. 7B.

Figure 7C:
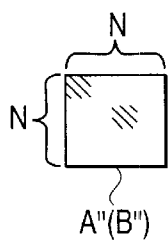

$e_i''$: evaluation value of block A" (B") between two ¼ reduced images (t−4) (t) shown in FIG. 7C.

The above evaluation values (H1), (H2), and (H3) are accumulated by unit of the candidate of the moving quantity for each block. As shown in right side of FIGS. 7A, 7B, 7C, a sum of the evaluation values by unit of candidate of the moving quantity is calculated for the block "A".

$$S1 = e_{A1} + e'_{A1} + e''_1,: \text{ For the moving quantity } (1, 1)$$

$$S2 = e_{A2} + e'_{A2} + e''_2,: \text{ For the moving quantity } (1, 0)$$

$$S3 = e_{A3} + e'_{A3} + e''_3,: \text{ For the moving quantity } (-1, 0)$$

$$\vdots \qquad \vdots$$

If one sum "S1" is the maximum value in all sums, the moving quantity of the block "A" between the two full size images (t−1) (t) is determined to be "(1, 1)".

In same way, a sum of the evaluation values by unit of candidate of the moving quantity is calculated for the block "B".

$$T1 = e_{B1} + e'_{B1} + e''_1, : \text{ For the moving quantity } (1, 1)$$

$$T2 = e_{B2} + e'_{B2} + e''_2, : \text{ For the moving quantity } (1, 0)$$

$$T3 = e_{B3} + e'_{B3} + e''_3, : \text{ For the moving quantity } (-1, 0)$$

$$\vdots \qquad \qquad \vdots$$

If one sum "T3" is the maximum value in all sums, the moving quantity of the block "B" between the two full size images (t−1) (t) is determined to be "(−1, 0)".

In the above-mentioned method (2), when the object is moving at a constant speed, the full size image may be reduced as 1/8 reduction ratio or 1/16 reduction ratio. In short, the assumption that the object is moving at a constant speed is necessary. However, if the time series images are rapidly inputted at an interval "1/1000 second", the object is regarded as a moving object of local constant speed.

The reduction of the image represents an enlargement of the corresponding block size. By using various size blocks, the moving quantity is obtained from a processed result of the most suitable size block. In short, by accumulating the evaluation values of the various size blocks, the moving quantity is stably selected. In general, the moving quantity decreases in proportion to the reduction of the image size. In the present invention, a resolution degree along the time direction is changed in synchronization with the reduction ratio. As a result, the moving quantity is fixed regardless of the reduction ratio. Accordingly, by accumulating the evaluation value for each reduced image (each reduction ratio) by unit of fixed moving quantity, the most suitable moving quantity is stably selected.

A memory can be used to store instructions for performing the process described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A moving quantity detection apparatus, comprising:
    image input means for inputting a plurality of images in time series at predetermined intervals;
    full size image processing means for dividing one image into a plurality of blocks of a predetermined size, and for calculating evaluation values between a particular block on the one image and each neighboring block corresponding to the particular block in time series images;
    reduced image processing means for reducing the plurality of images by a predetermined reduction ratio, for dividing one reduced image corresponding to the one image into a plurality of blocks of the predetermined size, and for calculating evaluation values between a particular block on the one reduced image and each neighboring block corresponding to the particular block on other reduced images, wherein at least one predetermined interval is proportional to the predetermined reduction ratio; and
    moving quantity detection means for selecting the neighboring block having the highest evaluation value, and for calculating a relative distance between the particular block on the one image and the one neighboring block on the time serial image.

2. The moving quantity detection apparatus according to claim 1,
    wherein said full size image processing means selects a block having clear edge elements.

3. The moving quantity detection apparatus according to claim 1,
    wherein the time serial image is a next image or a previous image inputted serially for the one image.

4. The moving quantity detection apparatus according to claim 1,
    wherein said full size image processing means determines an area of each neighboring block on the time serial image, a position of the area corresponds to a position of the particular block on the one image.

5. The moving quantity detection apparatus according to claim 1,
    wherein said full size image processing means calculates the evaluation value as a sum of differences of pixel values between each pixel in the particular block of the one image and corresponding pixels in the neighboring block of the time serial image.

6. The moving quantity detection apparatus according to claim 1,
    wherein the predetermined reduction ratio is $2^{-M}$ (M: a positive integer).

7. The moving quantity detection apparatus according to claim 1,
    wherein said reduced image processing means selects the particular block from each divided block on the one reduced image, the particular block includes a reduced image of a particular block of the one image.

8. The moving quantity detection apparatus according to claim 1,
    wherein said reduced image processing means selects the other reduced image from the plurality of reduced images, the input interval between a full size image of the one reduced image and a full size image of the other reduced image being a multiple of the predetermined interval with a reciprocal number of the predetermined reduction ratio.

9. The moving quantity detection apparatus according to claim 1,
    wherein said reduced image processing means reduces the plurality of images by other reduction ratio, divides one reduced image corresponding to the one image into a plurality of blocks of the predetermined size, and calculates each evaluation value between a particular block on the one reduced image and each neighboring block corresponding to the particular block on other reduced image corresponding to a multiple of the predetermined interval for the other reduction ratio.

10. The moving quantity detection apparatus according to claim 9,
    wherein said moving quantity detection means counts the evaluation value of each neighboring block for the time serial image, two other reduced images of the predetermined reduction ratio and the other reduction ratio, and selects one neighboring block whose evaluation value is highest.

11. A moving quantity detection method, comprising the steps of:

inputting a plurality of images in time series at predetermined intervals;

dividing one image into a plurality of blocks of a predetermined size;

calculating evaluation values between a particular block on the one image and each neighboring block corresponding to the particular block in time series images;

reducing the plurality of images by a predetermined reduction ratio;

dividing one reduced image corresponding to the one image into a plurality of blocks as the predetermined size;

calculating evaluation values between a particular block on the one reduced image and each neighboring block corresponding to the particular block on other reduced images, wherein at least one predetermined interval is proportional to the predetermined reduction ratio;

selecting the neighboring block having the highest evaluation values; and calculating a relative distance between the particular block on the one image and the one neighboring block on the time serial image.

12. The moving quantity detection method according to claim 11, wherein the particular block includes clear edge elements in comparison with other blocks in the one image.

13. The moving quantity detection method according to claim 11, wherein the time series image is a next image or a previous image inputted serially for the one image.

14. The moving quantity detection method according to claim 11, further comprising the step of:

determining an area of each neighboring block on the time serial image, a position of the area corresponding to a position of the particular block on the one image.

15. The moving quantity detection method according to claim 11, further comprising the step of:

calculating the evaluation value as a sum of differences of pixel values between each pixel in the particular block of the one image and corresponding pixels in the neighboring blocks of the time series images.

16. The moving quantity detection method according to claim 11, wherein the predetermined reduction ratio is $2^{-M}$ (M: a positive integer).

17. The moving quantity detection method according to claim 11, further comprising the step of:

selecting the particular block from each divided block on the one reduced image, the particular block including a reduced image of a particular block of the one image.

18. The moving quantity detection method according to claim 11, further comprising the step of:

selecting the other reduced image from the plurality of reduced images, the input interval between a full size image of the one reduced image and a full size image of the other reduced image being the multiple of the predetermined interval with a reciprocal number of the predetermined reduction ratio.

19. The moving quantity detection method according to claim 11, further comprising the steps of:

reducing the plurality of images by another reduction ratio;

dividing one reduced image corresponding to the one image into a plurality of blocks of the predetermined size; and calculating each evaluation value between a particular block on the one reduced image and each neighboring block corresponding to the particular block on other reduced image, the predetermined interval being proportional to the other reduction ratio.

20. The moving quantity detection method according to claim 19, further comprising the steps of:

counting the evaluation value of each neighboring block for the time serial image, two other reduced images of the predetermined reduction ratio and the other reduction ratio; and selecting the neighboring block having the highest evaluation value.

21. A computer readable memory containing computer readable instructions, comprising:

instruction means for causing a computer to input a plurality of images in time series at predetermined intervals;

instruction means for causing a computer to divide one image into a plurality of blocks of a predetermined size;

instruction means for causing a computer to calculate evaluation values between a particular block on the one image and each neighboring block corresponding to the particular block in time series images;

instruction means for causing a computer to reduce the plurality of images by a predetermined reduction ratio;

instruction means for causing a computer to divide one reduced image corresponding to the one image into a plurality of blocks of the predetermined size;

instruction means for causing a computer to calculate each evaluation value between a particular block on the one reduced image and each neighboring block corresponding to the particular block on other reduced images, wherein at least one predetermined interval is proportional to the predetermined reduction ratio;

instruction means for causing a computer to select the neighboring block having the highest evaluation value; and instruction means for causing a computer to calculate a relative distance between the particular block on the one image and the one neighboring block on the time serial image.

* * * * *